(No Model.) 2 Sheets—Sheet 1.
E. O. ERVIN.
COMBINED MOUNTED HAY STACKER AND RAKE.
No. 484,493. Patented Oct. 18, 1892.
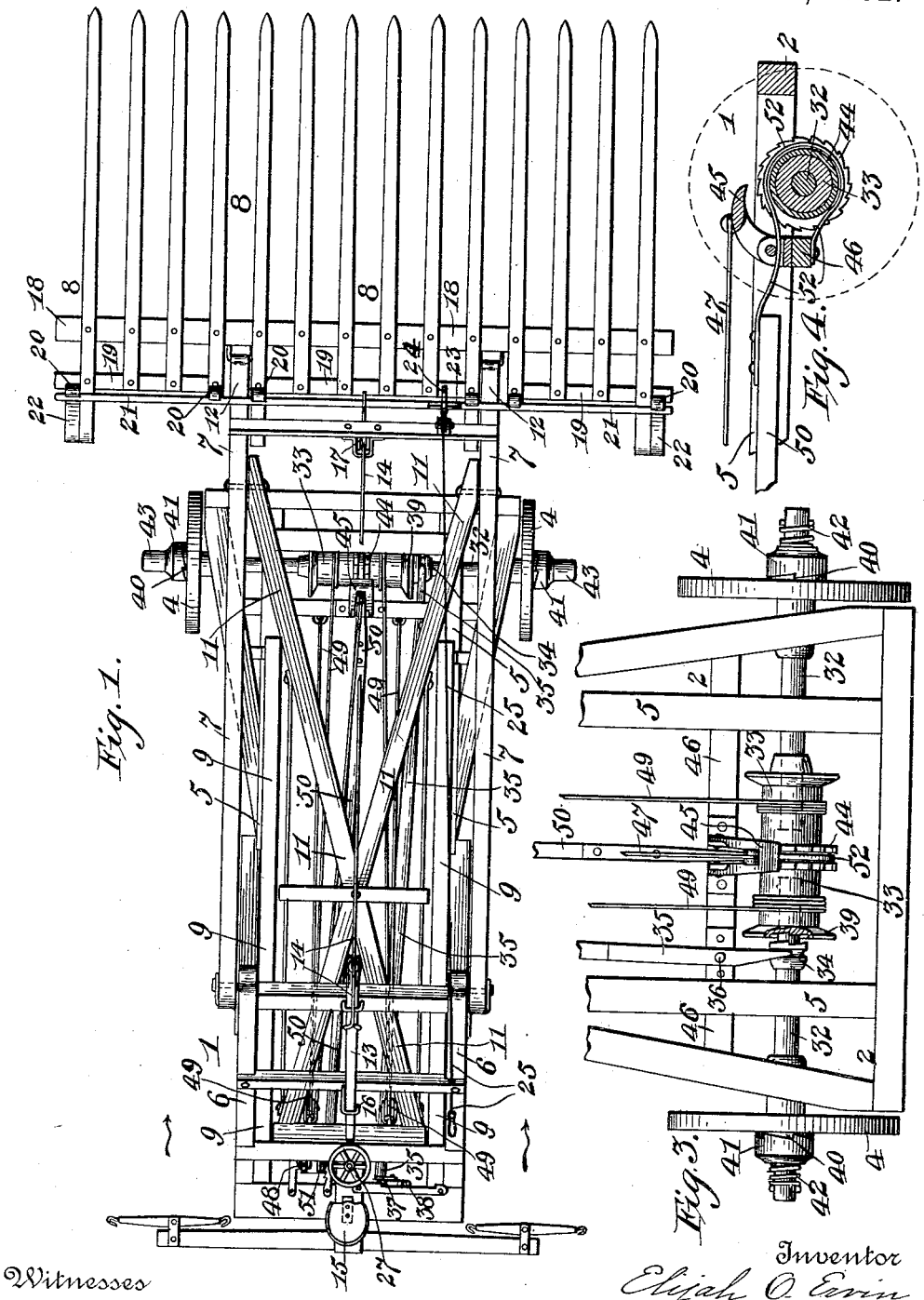
Witnesses
Severance
C. Hues
Inventor
Elijah O. Ervin
by
W. A. Bell & Co.
Attorneys

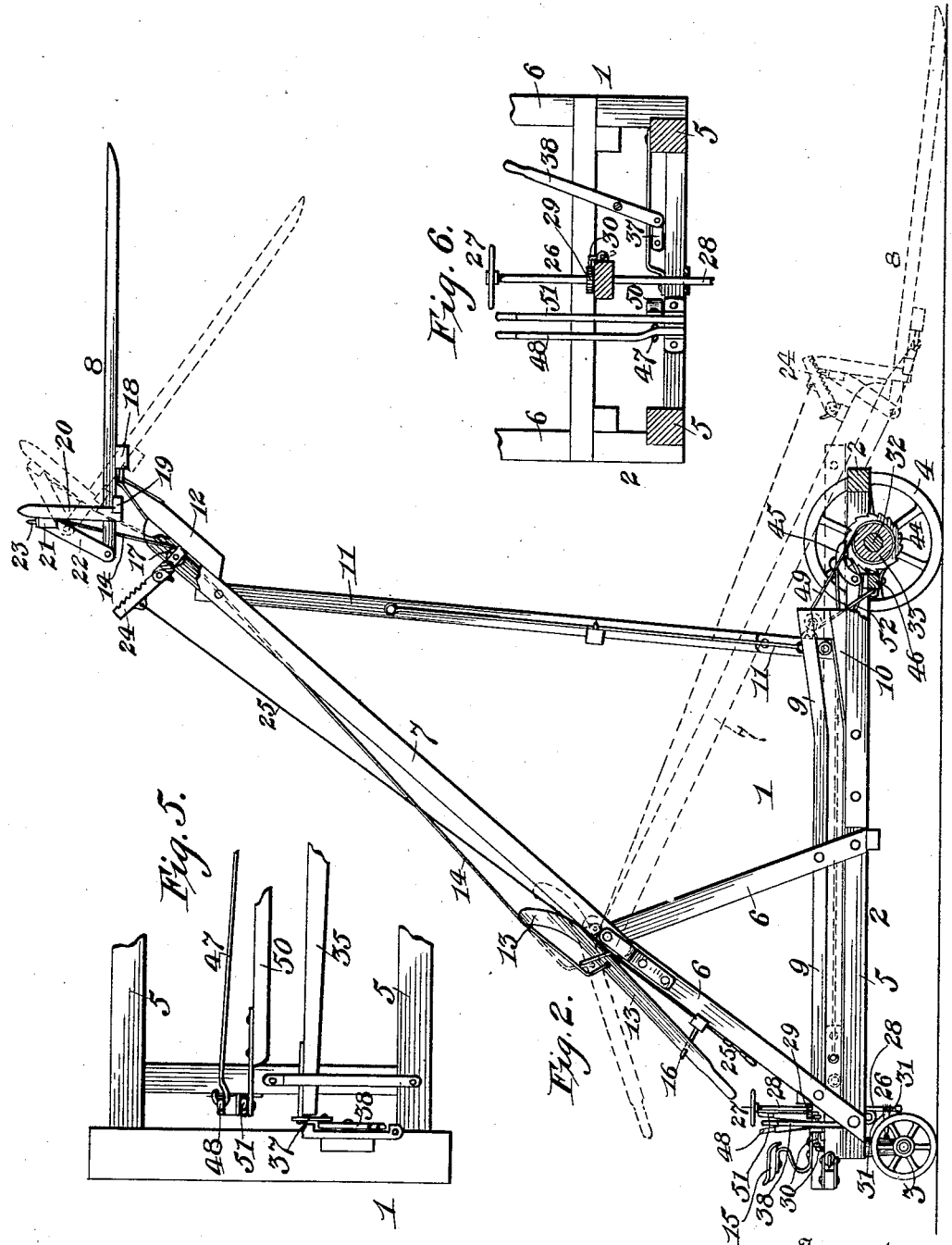

UNITED STATES PATENT OFFICE.

ELIJAH O. ERVIN, OF NEW VIRGINIA, IOWA.

COMBINED MOUNTED HAY STACKER AND RAKE.

SPECIFICATION forming part of Letters Patent No. 484,493, dated October 18, 1892.

Application filed April 11, 1892. Serial No. 428,671. (No model.)

*To all whom it may concern:*

Be it known that I, ELIJAH O. ERVIN, a citizen of the United States, residing at New Virginia, in the county of Warren and State of Iowa, have invented certain new and useful Improvements in a Combined Mounted Hay Stacker and Rake; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a combined hay rake and stacker; and it consists in certain novel constructions, combinations, and arrangements of parts, whereby hay may be raked in a field and by the same machine carried and stacked, as will be hereinafter described and specifically claimed.

In the accompanying drawings, Figure 1 is a top view of the machine, the rake being shown in a lowered position. Fig. 2 is a side view of the machine, the rake being shown in an elevated position in full lines and in a lowered position in dotted lines. Fig. 3 is a top view of a portion of the front end of the machine, showing the rake elevating and lowering mechanism. Fig. 4 is a sectional view of a portion of the rake elevating and lowering mechanism. Fig. 5 is a top view of a portion of the rear end of the machine, showing more particularly the levers for operating the pawl and brakes on the rake-elevating mechanism; and Fig. 6 is a sectional view of the rear end of the machine just in rear of the steering mechanism and looking toward the front and showing the steering apparatus and levers for regulating the rake-elevating mechanism.

1 in the drawings represents my improved machine, which is a combined hay rake and stacker, and consists of a suitable strong carriage frame or body 2, mounted on wheels 3 and 4 and provided at its rear end with a whiffletree, to which a team is attached—one horse or a team of horses on each side of the machine—the machine being drawn forward in the direction of the arrow. The frame is constructed with stout longitudinal and transverse bars, and to the bars 5 5 inverted-V-shaped supports 6 6 are secured, to the upper ends of which are pivoted the arms 7 7, to which the rake 8 is pivotally attached. On top of the longitudinal bars 5 5 spaced parallel longitudinal bars 9 9 are placed, which are held in this spaced condition by being secured at their rear ends and near the center of their length to the inverted-V-shaped supports and by being formed with spacing-lugs at their front ends, which rest on the longitudinal bars 5 5. The bars 5 5 are also provided at the termini of the parallel spaced bars 9 9 with inclines 10, and the front ends of the said parallel spaced bars are given a similar inclination, the object of this being to facilitate the descent of the rake. The space formed between the two bars serves as a guideway or track for the lower end of the somewhat X-shaped rake-support 11, which support is provided at its lower end with suitable rollers and at its upper end is pivoted near the upper end of the rake-arms 7 7, this support 11 being suitably strengthened by cross-braces and stringers. To the under side of the outer ends of the rake-arms 7 7 extension reach-arms 12 are rigidly secured, to which the rake 8 is pivoted, so as to have a free movement up and down.

At the center of the top cross-brace connecting the upper ends of the inverted-V-shaped supports or standards a rake-operating lever 13 is pivoted, its outer end being connected by a cord or rope 14 with the rake, and its inner or handle end being in close proximity to a driver's seat 15 on the carriage and adapted to be lowered and placed under a catch 16. When the lever is released by the operator of the machine, the handle end of the lever is raised by the preponderating weight of the rake, but is prevented from rising too high by a loop secured on the cross-brace connecting the upper ends of the inverted-V-shaped standards and through which the operating-rake lever passes. The rope 14 is connected to the center of the back of the rake, passed under a pulley 17, back over a groove in the top of the outer end of the operating-rake lever, and connected to the lever at a point a little below its outer end. The rake 8 is made exceedingly strong, being provided on its under side near its rear end with a transverse strengthening-brace 18, which is firmly riveted to the rake-teeth, and provided along its rear edge with spaced strengthening-braces 19. The outer and two of the intermediate rake-teeth are of greater length than the other teeth and extend backward a short distance. At the ends of the strengthening-braces 19 short upright bars 20 are secured, and these bars are all connected near their upper ends by a transverse bar 21. The outer rear ends of the long teeth are connected to the connecting-bar 21 by strong slanting braces 22. By this construction all the parts of the rake are firmly braced, and the hay in being raked is prevented by the back of the rake from being forced backward too far, and also by forming the back of the rake with spaced braces a free up-and-down movement is permitted to the rake without interfering with the other parts of the machine. The bar 21 may be provided with a pawl 23, over which a ratchet-bar 24, pivoted to a cross-brace on the rake-arms, is adapted to be placed, and to an eye on the back of this bar a rope 25 is attached and carried backward and attached at a convenient place within the reach of the operator. The object of this pawl and ratchet is to set the rake proper at any desired angle and firmly hold the same in a fixed position while it is being used in raking. This is accomplished by drawing on the operating-rope 25, and thereby raising the ratchet-bar, lowering the rake to the position desired, and then releasing the rope 25 and allowing the ratchet-bar to drop over the pawl, and thereby securely lock the rake in that position.

At the rear end of the machine, in close proximity to the driver's seat, a steering apparatus 26 is provided on the frame of the machine, which works in conjunction with the rear pivoted axle and consists of a hand-wheel 27, rigidly secured to a vertical winding-rod 28, which latter extends down below the bottom of the carriage. This winding-rod is provided with a cog-wheel 29, which works in conjunction with a foot-operating lever 30 just below the driver's seat. Two ropes or chains 31 are reversely wound around the vertical rod 28 and attached by their opposite ends to the axle at points to the right and left of the center of the same, whereby by turning the hand-wheel 27 in one direction one of the chains will be wound up and the other unwound, and vice versa, and the rear wheels turned as desired.

The front axle 32 is divided into two short independently-revoluble axles provided with a winding-drum 33, which is revoluble independently of the said axle 32, and at one end the drum is provided with a disk 39, having internal ratchet-teeth, which is adapted to receive and engage a sliding clutch 34, which latter is slid on the axle by a rod 35, pivoted at 36 to a cross-brace 46 of the machine. The rear end of the rod 35 is connected by a link 37 to a lever 38, pivoted to a rear cross-brace, and is adapted to vibrate the rod 35 to the right or left, and thereby move the clutch 34 into and out of gear with the clutch-disk 39 on the revoluble drum 33. The front wheels 4 are provided with ratchet-hubs 40, which work in conjunction with sliding ratchet-collars 41, which latter are kept in contact with the ratchet-hubs by spiral springs 42, as shown. The ratchets are so constructed that when the machine is moved backward the wheels only revolve; but when moved forward both the wheels and axles revolve. The outer ends of the front axles, with the ratchet-hub, are covered by protecting hoods or caps 43, as shown. The winding-drum 33 is provided about midway of its length with a grooved ratchet-disk 44, which works in conjunction with a pawl 45, pivoted on the frame-brace 46. The pawl is operated by a cord 47, attached to a lever 48 in near reach of the driver. A rope 49 is passed through the ratchet peripheral disk 43 and both of its ends carried back and passed over and around pulleys on the lower end of the rake-support 11, and then carried forward and attached to the cross-brace 46 near the front end of the machine. When the rake proper is elevated and it is desired to lower the same, the speed at which it descends is regulated by a strap-brake 52, which is attached by one of its ends to an operating rod or cord 50, passed around the grooved ratchet-disk 44 on the drum and attached by its other end to the under side of frame-brace 46. The rod or cord 50 is attached to a lever 51 near the driver's seat.

The operation of my invention is as follows: The rake is lowered to the desired position—say to that shown in Fig. 2 by dotted lines—and the altitude of the rake proper fixed and held by the ratchet-and-pawl mechanism 24. The carriage is then moved forward until a load of hay or grass is gathered on the rake, at which time the sliding clutch is moved to engagement with the winding drum or rollers and the rake is elevated to the desired height, when the clutch is disengaged from the drum and the drum prevented from revolving backward by the pawl 45 by being forced into contact with the ratchet-disk 44 by the lever 48. The rake is now dumped by means of the pivoted lever 13 and again returned to its normal position by said lever. By withdrawing the ratchet-pawl 45 from contact with the ratchet-disk 44 the rake and its support and arms will be lowered automatically, the descent being regulated by the strap-brake 52, brought to bear on the winding-drum.

What I claim as my invention is—

1. In a combined hay rake and stacker, the combination of a suitably-mounted carriage, suitable standards 6, rake-arms 7, pivoted to said standards and having pivoted at their outer ends the rake 8, and a rake-support 11, pivoted near the upper ends of the arms 7 and its lower end arranged to move in guideways on the frame, substantially as described.

2. In a combined hay rake and stacker, the combination of a suitably-mounted carriage, suitable standards 6, rake-arms 7, pivoted to said standards and having pivoted at their outer ends the rake 8, and a rake-support 11, pivoted near the upper ends of the rake-arms 7 and having rollers at their lower ends working in the guideway, a rake-operating lever 13, attached to the rear end of the rake-head by a rope, substantially as described.

3. In a suitably-mounted combined hay rake and stacker, the combination of the front axle formed of two independently-revoluble short axles having supporting-wheels made fast and loose by ratchet-collars and hubs and carrying a winding-drum which revolves independently of said axles and is provided with an end ratchet-disk and a peripheral ratchet, a sliding clutch on one of the short axles, adapted to be moved into and out of engagement with the said end ratchet-disk, a pivoted pawl adapted to move in and out of engagement with the peripheral ratchet, means for operating the pawl, a strap-brake around the winding-drum, a lever for operating the brake, a rake proper, and a swinging and sliding rake-support, substantially as described.

4. In a combined suitably-mounted hay rake and stacker, the combination of a carriage, a swinging and sliding rake-support 11, standard 6, rake-arms 7, pivoted to said standard and having the rake pivoted to their outer ends, rake 8, a rake-operating lever 13, connected to the rake by a rope, and means for adjusting the rake-head to any desired angle and holding it in position, the said means comprising pawl 23, located on the rake-head, ratchet-bar 24, pivoted to the rake-arm and working in conjunction with the pawl, and the operating-rope 25, attached to the bar, substantially as described.

5. In a combined hay rake and stacker, the front axle carrying the winding-drum, which is revoluble independently of said axle and provided with an end disk having internal ratchet-teeth, a sliding clutch on one of the short axles, adapted to be moved in and out of engagement with said ratchet-disk, a mounted rake-carriage, the rake proper, a swinging and sliding rake-support, and means for operating the several parts named, substantially as described.

6. In a combined mounted hay rake and stacker, the combination of a swinging and sliding rake-support, a front axle formed with two independently-revoluble short axles having a winding-drum revoluble independent of said axle and provided with an end disk having internal ratchet-teeth and with a peripheral ratchet, a sliding clutch adapted to be moved in and out of engagement with the end ratchet-disk, and the pivoted ratchet-pawl adapted to be moved into and out of engagement with the peripheral ratchet, a strap-brake operating upon the winding-drum to regulate the descent of the rake, and means for operating the parts named, substantially as described.

7. The combined hay rake and stacker, comprising in its construction a suitably-mounted carriage and an elevating-rake pivoted on said frame and to a sliding and swinging support, said rake having some of its teeth extending backward beyond the rake-head bars and strengthened by diagonal braces and also having spaced openings in its rear rake-head bar to admit of the front end of the axle or hinging arms being passed to the front rake-head bar, substantially as and for the purpose described.

In testimony whereof I affix my signature in presence of two witnesses.

ELIJAH O. ERVIN.

Witnesses:
W. S. ASBURY,
J. H. WILLS.